United States Patent [19]

Crewson

[11] Patent Number: 5,762,165
[45] Date of Patent: Jun. 9, 1998

[54] STROKE INDICATOR

[76] Inventor: Gary E. Crewson, 49 Silent Meadow, Orchard Park, N.Y. 14127

[21] Appl. No.: 700,844

[22] Filed: Aug. 21, 1996

[51] Int. Cl.⁶ .................................................. F16D 66/02
[52] U.S. Cl. ........................ 188/1.11 W; 188/79.55
[58] Field of Search ............... 188/1.11 W, 1.11 WE, 188/1.11 R, 1.11 L

[56] References Cited

U.S. PATENT DOCUMENTS

| 4,776,438 | 10/1988 | Schandelmeier | 188/1.11 W |
|---|---|---|---|
| 5,002,164 | 3/1991 | Bowyer | 188/1.11 W |
| 5,131,163 | 7/1992 | Crewson et al. | 33/609 |
| 5,320,198 | 6/1994 | Hoyt et al. | 188/1.11 W |
| 5,350,043 | 9/1994 | Crewson et al. | 188/79.55 |
| 5,358,076 | 10/1994 | Lucas | 188/1.11 W |
| 5,535,854 | 7/1996 | Prince | 188/1.11 W |

OTHER PUBLICATIONS

Haldex Corporation–Brochure–1992.
CPL Systems–Tattle–Tale–date unknown.

Primary Examiner—Matthew C. Graham
Attorney, Agent, or Firm—Bean, Kauffman & Snyder

[57] ABSTRACT

Indicia is applied to opposite side surfaces of a housing of a slack adjuster for vehicle brakes and a pointer is fixed for movement with a connector serving to pivotally connect the housing to a brake operating rod; the pointer cooperating with the indicia to provide visual indication of when the brake operating rod is in a retracted brake release position and when movement of such operating rod away from the brake release position exceeds a desired limit of brake operating movement.

2 Claims, 5 Drawing Sheets

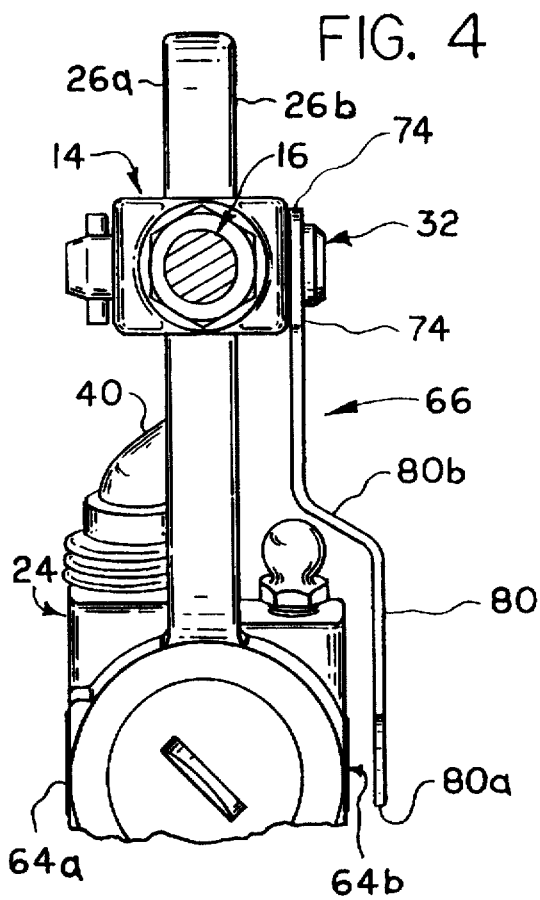
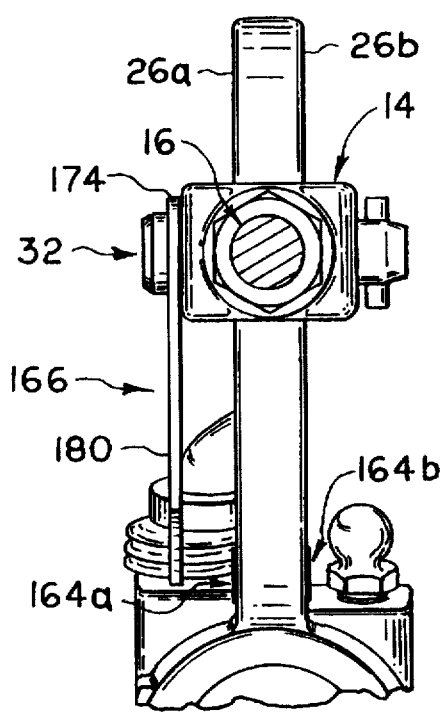
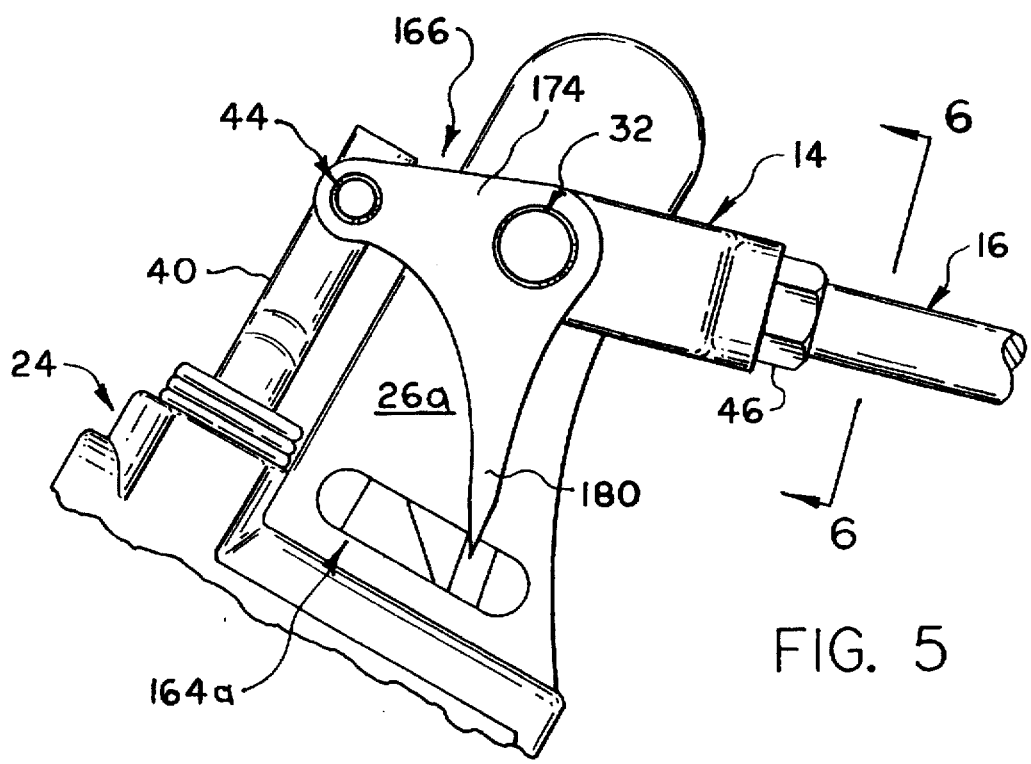

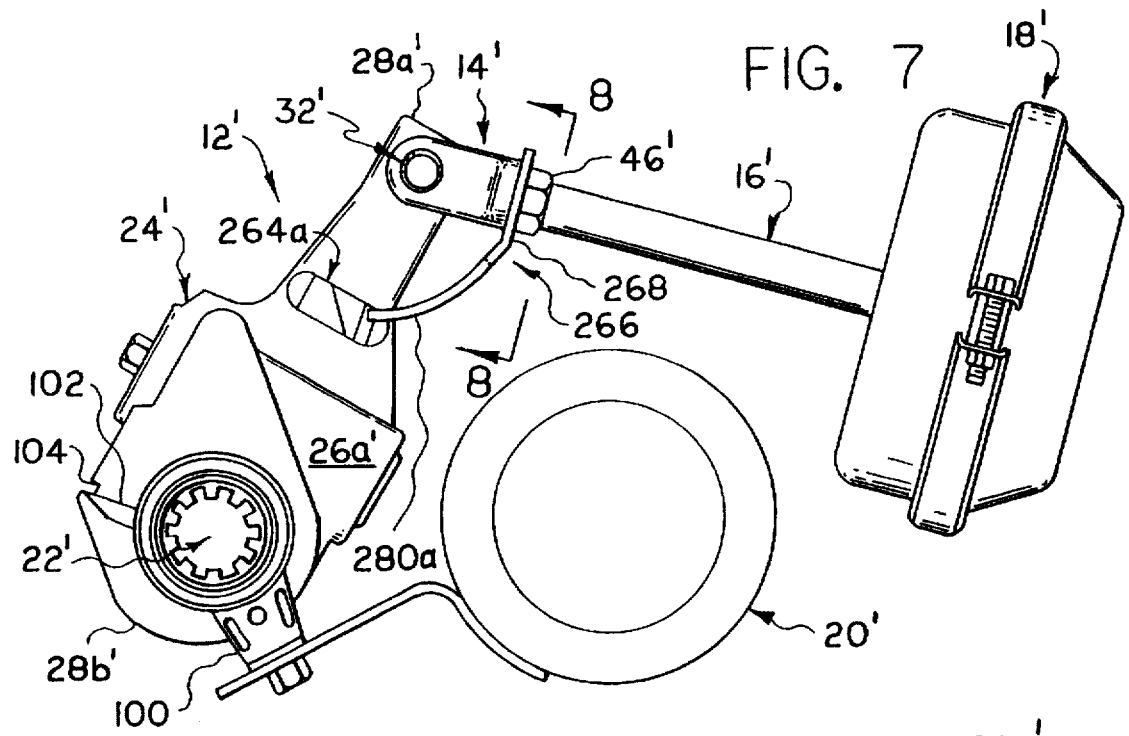
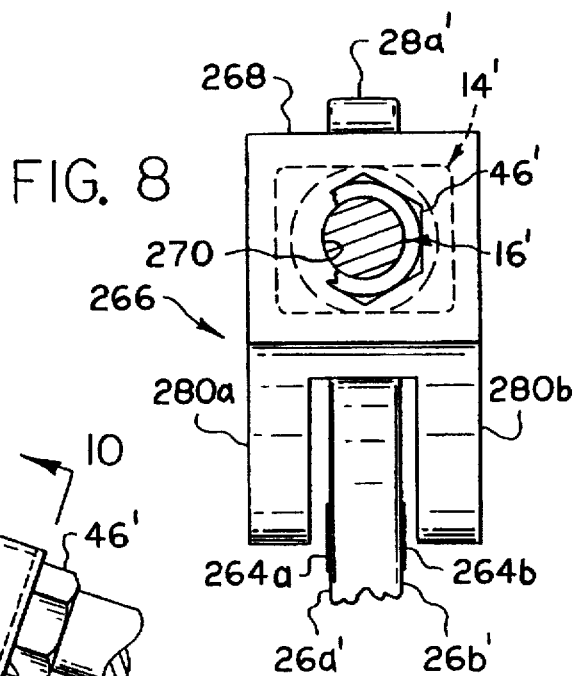
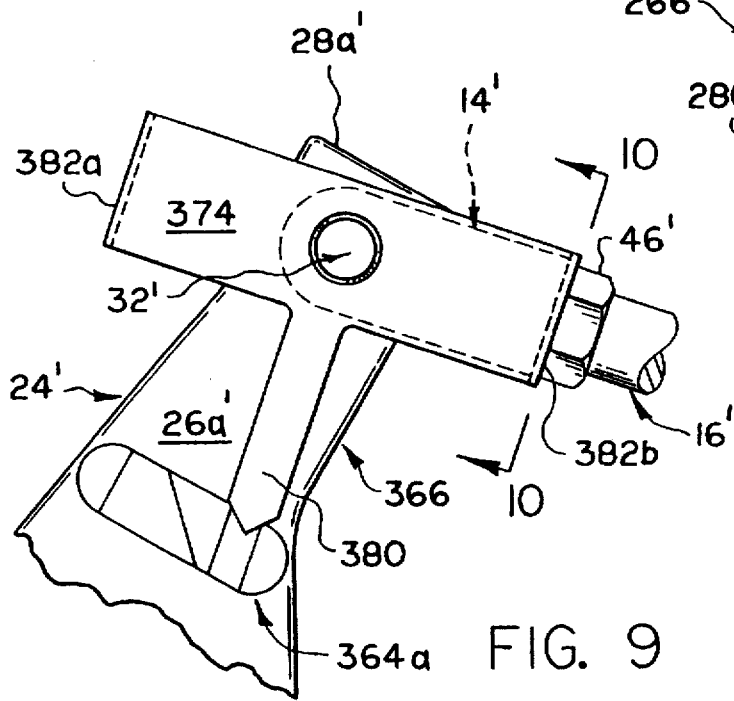

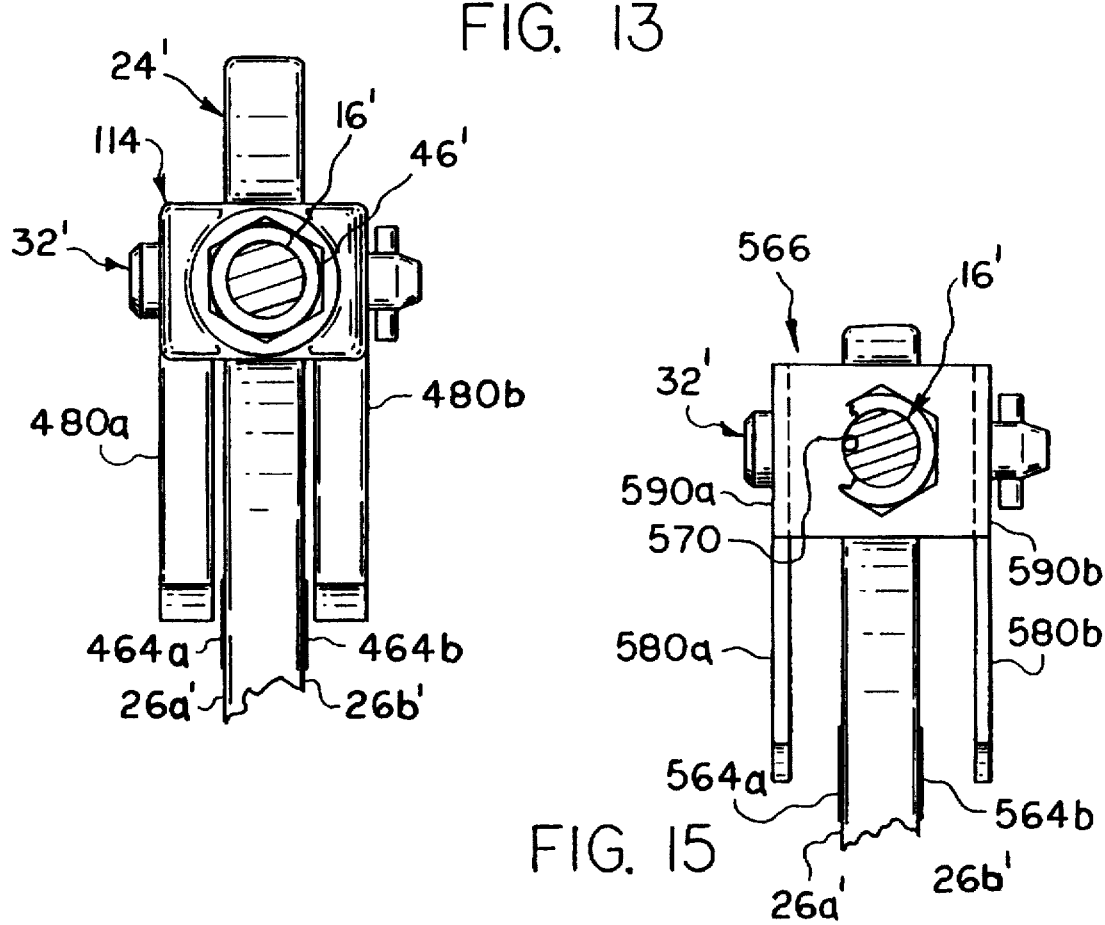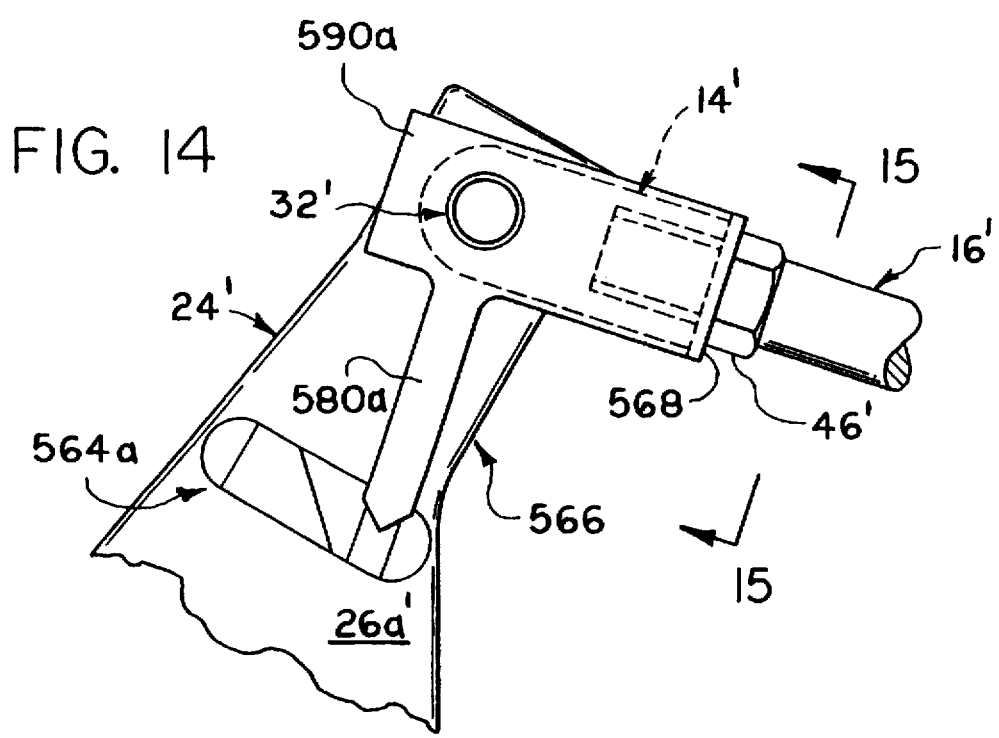

STROKE INDICATOR

BACKGROUND OF THE INVENTION

Slack adjusters for vehicle brakes typically include a housing having one end coupled to a brake operating or cam shaft and an opposite end pivotally connected via a connector to a brake operating rod coupled in turn to an air chamber. Upon the introduction of compressed air to the air chamber upon actuation of a vehicle brake pedal, the operating rod is moved away from its normal brake release position as an incident to which the housing is swung about the axis of the brake operating shaft for brake operating purposes.

Various types of devices have been proposed for use in providing a visual indication of the proper brake release or properly installed position of a brake adjuster or of the distance through which a brake adjuster is moved incident to the application of the brakes of a vehicle. The latter type of device is desirable, since extension or movement of the brake operating rod beyond a given or predetermined distance, which varies depending on the type of air cylinder being employed, provides an indication of excessive wear of the vehicle brakes leading to brake failure.

As by way of example, the Haldex Corporation markets an automatic brake adjuster having a built-in installation indicator serving to provide visual confirmation that the brake adjuster is properly installed. This brake adjuster includes a housing fitted with a fixed indicator plate defining a notch and a rotatably supported control arm, which is adapted to be attached to a fixed point and serves to mount a pointer alignable with the notch to indicate a correctly installed position. Drawbacks of this arrangement are that it does not provide a visual indication of the extent of movement of the brake adjuster incident to operation of the vehicle brakes and the installation indicator is difficult, if not impossible, to observe from both sides of a vehicle.

U.S. Pat. No. 4,776,438 discloses a brake adjustment indicator adapted to show the extent of movement of a brake adjuster incident to application of vehicle brakes. Drawbacks of this arrangement are that it is not adapted to provide a visual indication of a properly installed position of a brake adjuster, and it appears to be difficult to observe from both sides of a vehicle particularly when used in combination with air chambers characterized as moving their associated operating rods through a relatively short path of travel.

A further type of brake adjuster indicator, which is somewhat similar to that described in U.S. Pat. No. 4,776,438 and includes an indicator mounted on an air cylinder for cooperation with an operating rod, is referred to as the Tattle-Tale, and distributed in Canada by CPL Systems of Campbellville, Ontario.

SUMMARY OF THE INVENTION

The present invention is directed to a visual indicator adapted for use in showing, as desired, a properly installed brake release condition of a brake adjuster and when movement of the brake adjuster exceeds a desired limit of operating movement. The indicator may be viewed from either side of a vehicle.

In a preferred form of the invention, a pointer member is mounted for movement with a connector, such as a clevis, serving to connect a brake adjuster to an operating rod movable under the control of an air cylinder and indicia is mounted on at least one and preferably both sides of the slack adjuster for cooperation with the pointer member for purposes of providing a visual indication of a properly installed brake release position of the slack adjuster/fully retracted position of the operating rod and when movement of the slack adjuster/operating rod away from the brake release position exceeds a desired limit of movement.

BRIEF DESCRIPTION OF THE DRAWINGS

The nature and mode of operation of the present invention will now be more fully described in the following detailed description taken with the accompanying drawings wherein:

FIG. 4 is a view similar to FIG. 3, but with the pointer arranged on a side of the slack adjuster opposite from that viewed in FIG. 1;

FIG. 5 is a fragmenting view of the slack adjuster of FIG. 1, but showing an alternative pointer construction;

FIG. 6 is a sectional view taken generally along the line 6—6 in FIG. 5;

FIG. 7 is a side elevational view of another type of slack adjuster incorporating a further alternative pointer of the present invention;

FIG. 8 is a sectional view taken generally along the line 8—8 in FIG. 7;

FIG. 9 is a fragmenting view of the slack adjuster of FIG. 7, but showing a further pointer construction;

FIG. 13 is a sectional view taken generally along the line 13—13 in FIG. 12;

FIG. 14 is a view similar to FIG. 9, but showing an additional pointer construction; and FIG. 15 is a sectional view taken generally along the line 15—15 of FIG. 14.

DETAILED DESCRIPTION

Figure 1:
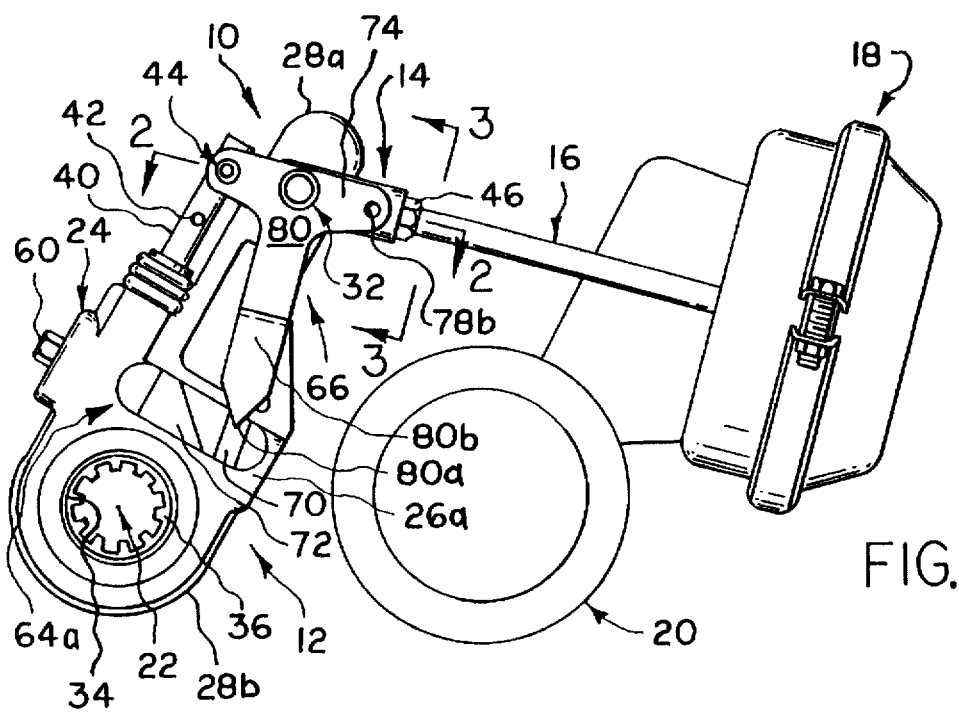
FIG. 1 is a side elevational view of a slack adjuster incorporating the present invention in a trailer axle application.

Reference is first made to FIG. 1 wherein an indicator formed in accordance with a presently preferred form of the invention is generally designated as 10 and shown for example in association with an automatic slack adjuster 12 adjustably coupled via a connector 14 to an operating rod or push rod 16 extending from an air chamber or air operated cylinder 18 mounted on a trailer axle 20. Slack adjuster 12 is in turn operably connected to brakes, not shown, of the trailer by a rotatably supported brake operating or cam shaft 22.

Slack adjuster 12 is shown, for example, in FIGS. 1–4 as being of the type disclosed in U.S. Pat. No. 5,350,043, wherein the adjuster generally includes a housing 24 having opposite sides 26a and 26b extending between first and second ends 28a and 28b. First end 28a is formed with a bore opening 30 extending between opposite sides 26a and 26b and sized to removably, slidably receive a first pivot pin 32, and second end 28b is formed with an opening 34 extending between opposite sides 26a and 26b and sized to receive a worm gear 36 which is keyed for rotation with shaft 22. Housing 24 additionally serves to slidably mount a control link 40 whose free upper end is formed with a plurality of bore openings 42 sized to removably, slidably receive a second pivot pin 44.

Figure 2:
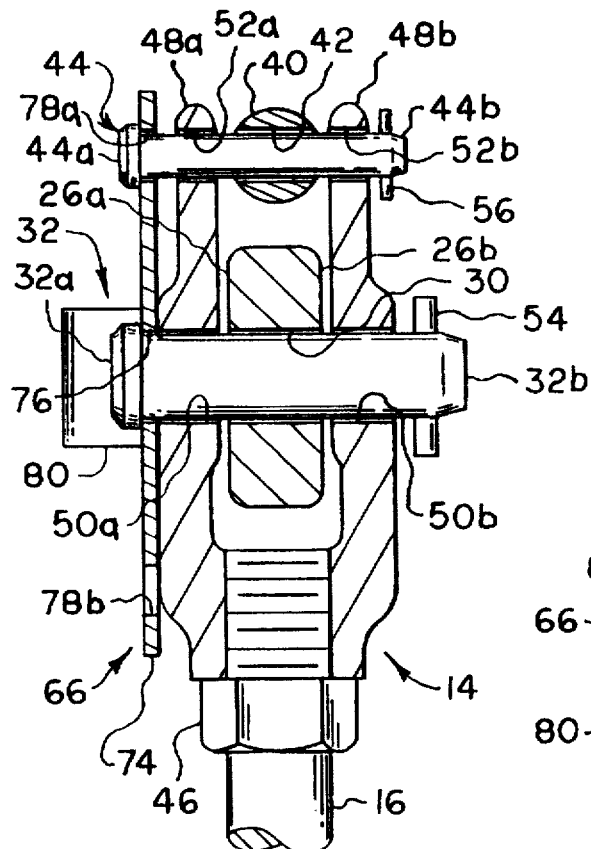
FIG. 2 is a sectional view taken generally along the line 2—2 in FIG. 1.

Typically, connector 14 is in the form of a clevis, which is adjustably, threadably mounted on a free end of operating rod 16 and locked in adjusted position thereon by a nut 46. As best shown in FIG. 2, the legs 48a and 48b of the clevis are formed with a first pair of aligned openings 50a and 50b for slidably receiving first pivot pin 32 and a second pair of aligned openings 52a and 52b for slidably receiving second pivot pin 44. Pivot pins 32 and 44 are normally retained in mounted position relative to housing 24, the clevis 14 and control link 40 by forming same with enlarged head end portions 32a and 44a and with opposite through bored end portions 32b and 44b adapted to removably receive retaining pins 54 and 56.

It will be understood that slack adjuster 12 is preferably initially installed with the aid of a mounting gauge of the type described in U.S. Pat. No. 5,131,163 to arrange a line drawn through the centers of openings 30 and 34 of housing 24 to assume a desired angular relationship relative to the axis of operating rod 16 when the operating rod is disposed in a retracted, brake release position relative to air chamber 18, as generally depicted in FIG. 1. Upon the depression of a brake pedal, not shown, air introduced into chamber 18 serves to extend or affect brake operating movement of operating rod 16 to the left, as viewed in FIG. 1, whereby to swing housing 24 about the axis of shaft 22 and thus affect rotation of such shaft for brake operating purposes. Upon release of the brake pedal, operating rod 16 is returned to its initial or brake release position and shaft 22 caused to undergo counter-rotation to affect release of the vehicle brakes.

In an automatic slack adjuster of the type described in above-referenced U.S. Pat. No. 5,350,043, any adjustment of the angular orientation of housing 24 relative to shaft 22 required to accommodate for wear of the vehicle brakes, is affected at the conclusion of a brake operational cycle. In another type of known automatic slack adjuster, adjustment is affected at the initiation of a brake operational cycle. In manual type slack adjusters, a workman is required to effect periodical manual adjustments of the angular orientation of housing 24 relative to shaft 22, as by rotations of nut 60, in order to affect adjustment of vehicle brakes to compensate for wearing away thereof. In these various types of brake adjusters, upwards of a predetermined or given extent of movement of operating rod 16 away from brake release position is required to affect operation of properly adjusted brakes. The extent of required movement will be determined by the size or type of air chamber 18 used with a particular vehicle. For any given size or type of air chamber, extension or movement of operating rod 16 beyond a predetermined amount is undesirable, since this will result in a gradual loss of braking capability resulting from excessive wear. Thus, it is desirable to provide means whereby it is possible to visually determine whether a brake adjuster is properly arranged in a desired brake release position when the vehicle brake pedal is released and/or to determine whether the range of movement of operating rod 16 remains within a desired limit when the vehicle brake pedal is depressed.

In accordance with a preferred form of the present invention, means are employed to provide a visual indication of both a brake release position of operator rod 16/adjuster housing 24 and when movement of such operator rod exceeds a desired limit of brake operating movement. A presently preferred form of such means is shown in FIGS. 1–4 for use in association with a slack adjuster 12 of the general type disclosed in U.S. Pat. No. 5,350,043, wherein there is provided in combination indicia means 64a and 64b carried on housing sides 26a and 26b, respectively; and pointer means 66 constructed and mounted on connector 14, so as to permit it to alternatively cooperate with indicia means 64a and 64b. In this preferred construction, each of the indicia means defines, as shown only for the case of indicia means 64a in FIG. 1, first and second indicia 70 and 72, which may, for example, in the form of Green bands or areas printed on a common label adhesively fixed to housing 24. Indicia means 64a and 64b are preferably applied as an incident to the manufacture of slack adjuster 12 in order to insure accurate positioning thereof on housing 24.

Pointer means 66 is shown in FIGS. 1–4 as being in the form of a bracket having a base portion 74 formed with first bore opening 76 and second bore openings 78a and 78b; and an elongated pointer member 80 projecting at a right angle relative to the base portion from adjacent first bore opening 76. As will be apparent from viewing FIG. 2, first bore opening 76 is sized to slidably receive first pivot pin 32 and second bore openings 78a and 78b are spaced equally from the first bore opening and sized to slidably receive second pivot pin 44. With this arrangement, the mounting of pointer means 66 on connector 14 with first pivot pin 32 received within first bore opening 76 and second pivot pin 44 received within second bore opening 78a serves to arrange pointer member 80 for cooperation with indicia means 64a carried on housing side 26a positioned such that the pointer member points to first indicia 70 when operator rod 16 is in its brake release position and points to second indicia 72 when the operator rod is properly extended incident to operation of a brake pedal. Placement of pointer member 80 to the right or left of first indicia 70 when the vehicle brakes are released would provide a visual indication that the initial angular orientation of housing 24 relative to operating rod 16 is not correct. On the other hand, movement of pointer member 80 beyond second indicia 72 in a direction away from first indicia 70, that is, to the left of the second indicia, as viewed in FIG. 1, when the vehicle brakes are applied would provide a visual indication that movement of operating rod 16 away from the brake release position exceeds a desired limit of brake operating movement.

Figure 3:
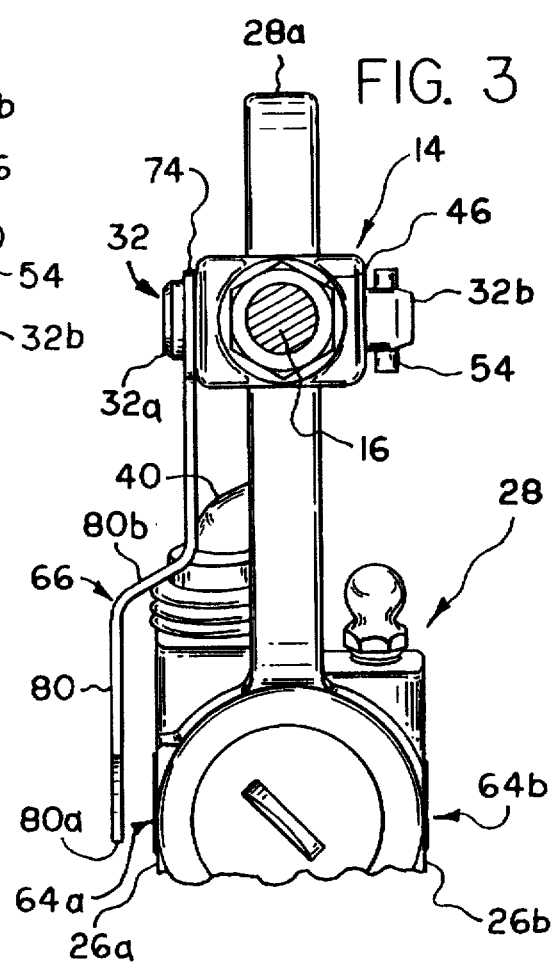
FIG. 3 is a sectional view taken generally along the line 3—3 in FIG. 1.

Pointer member 80 may be arranged adjacent housing side 26b for operable association with indicia means 64b by removing pointer means 66 from its mounted position shown in FIGS. 1–3, turning the pointer means through 180°, and then mounting same adjacent the opposite housing side 26b with first pivot pin 32 within first bore opening 76 and second pivot pin 44 within second bore opening 78b, as shown generally in FIG. 4.

It is preferred to place indicia means 64a and 64b relatively adjacent second end 28b of housing 28, as shown in FIG. 1, in that viewing of the position of pointer member 80 is facilitated by maximizing the distance of the indicia means from first pivot pin 32, that is, the greater the distance, the longer the permissive size of the indicia means in a direction aligned with the arc of travel of the free end 80a of the pointer member. This, however, requires the pointer member to be stepped intermediate its ends, as best shown at 80b in FIGS. 3 and 4, to accommodate for the difference in thickness of housing 28, as measured between sides 26a and 26b adjacent ends 28a and 28b.

Reference is now made to FIGS. 5 and 6, wherein a second form of pointer means 166 is shown as being mounted on connector 14 in place of previously described pointer means 66. Pointer means 166 includes a generally L-shaped flat plate defining a base portion 174 and a pointer member 180, wherein the base portion is formed with a first bore opening, not shown, for slidably receiving first pivot pin 32 and a single second bore opening, also not shown, for slidably receiving second pivot pin 44. Indicia means 164a and 164b may be, if desired, similar in overall appearance to indicia means 64a and 64b, as shown for the case of indicia means 164a in FIG. 5, but necessarily of smaller size, due to their being mounted relatively adjacent housing first end 28a. While the illustrated construction is more difficult to view at a distance, it none-the-less has the advantage that pointer means 166 is less costly to manufacture than pointer means 66 in that only a single second bore opening is required to be formed and pointer member 180 need not be of stepped construction.

In FIGS. 7 and 8 there is illustrated an installation employing an automatic slack adjuster of a type distributed by the Haldex Corporation of Blue Springs, Mo., wherein parts of such adjuster and adjacent elements of the installation, which are similar to those of FIG. 1, are designated by like primed numerals. Adjuster 12' differs from the adjuster of U.S. Pat. No. 5,350,043 in that slack adjustments are affected with the aid of a control arm 100, which has one end fixed to a suitable fixed support, such as axle 20', and an opposite end rotatably supported by housing 24'. Control arm 100 is fitted with a pointer 102, which is arranged to lie in alignment with a notch 104 fixed relative to one side 26a' of housing 24' to visually indicate the proper orientation of the housing when operating rod 16' is in its retracted or brake release position. Also, in this construction connector 14' differs from previously described connector 14 in that its parallel legs are shortened and formed with only one pair of bore openings for slidably receiving first pivot pin 32'.

A drawback of the type of construction shown in FIG. 7 is that it is possible to visually determine whether proper installation of housing 24' has been affected from only one side of a vehicle on which adjuster 12' is installed.

In accordance with the present invention, slack adjuster 12' may be fitted with means for providing visual indication of movement of operating rod 16' relative to its brake release position, which in a preferred form is subject to observation from both sides of a vehicle. In this form of the invention, there may be provided indicia means 264a and 264b associated with housing sides 26a' and 26b' and provided with an overall appearance and placement corresponding to indicia means 164a and 164b, respectively. In this construction, pointer means 266 is a bracket including a base portion 268 clamped for movement with a connector 14' relative to pivot pin 32' by nut 46'. Base portion 268 is formed with a reference opening 270 for removably receiving operating rod 16', and a pair of pointer members 280a and 280b are connected to the opposite ends of the base portion, as best shown in FIG. 8, and arranged to extend arcuately relative to pivot pin 32' for cooperation with indicia means 264a and 264b, as best shown in FIG. 7 for the case of indicia means 264a.

Figure 11:
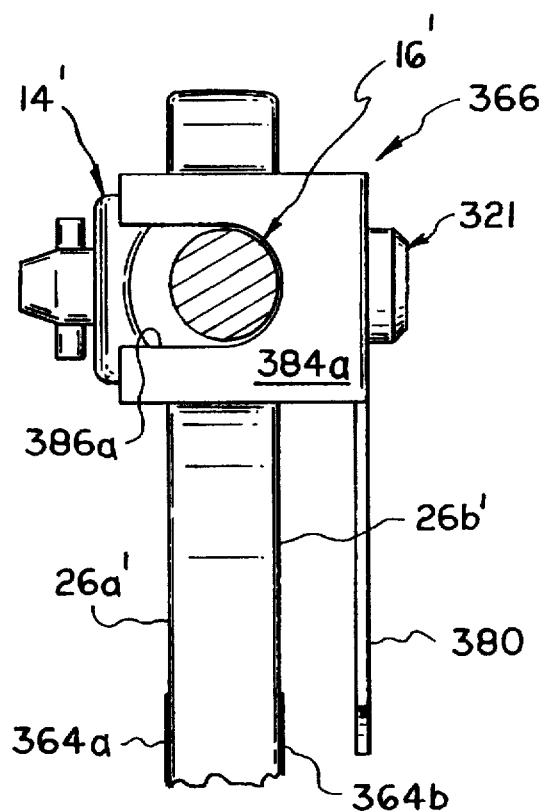
FIG. 11 is a view similar to FIG. 10, but showing the pointer arranged on a side of the slack adjuster opposite from that viewed in FIG. 9.
Figure 10:
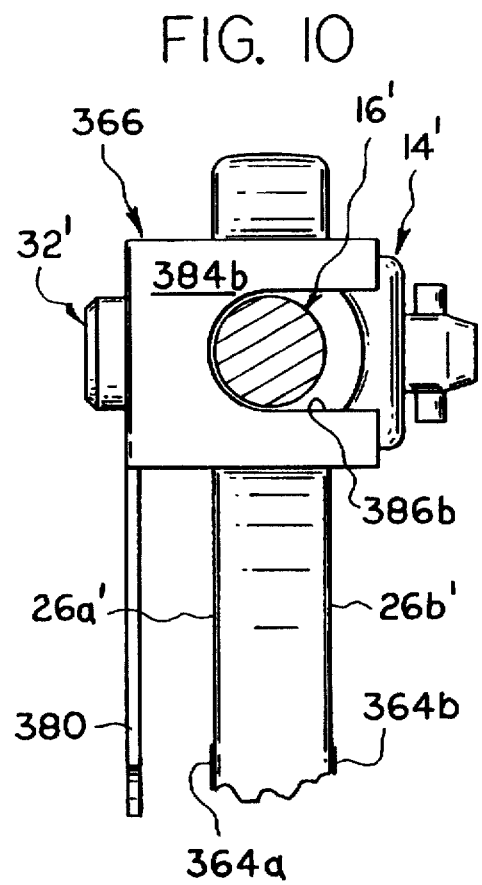
FIG. 10 is a sectional view taken generally along the line 10—10 in FIG. 9.

In FIGS. 9–11, a further form of the invention is shown in association with housing 24', and as including indicia means 364a and 364b associated with housing sides 26a' and 26b' and having an overall appearance and placement corresponding to indicia means of FIGS. 5 and 6. In this construction, pointer means 366 is a bracket including a base portion 374 having a centrally located bore opening, not shown, for slidably receiving first pivot pin 32' and a depending pointer member 380 projecting from adjacent such bore opening; and a pair of parallel end portions 384a and 284b having aligned reference openings 386a and 386b for alternatively receiving operating rod 16', as shown in FIGS. 11 and 10, respectively. When placed to receive operating rod 16', one or the other of end portions 384a and 384b are clamped to connector 14' by nut 46' in order to prevent pivotal movement of pointer means 366 relative to the connector about the axis of pivot pin 32'.

Figure 12:
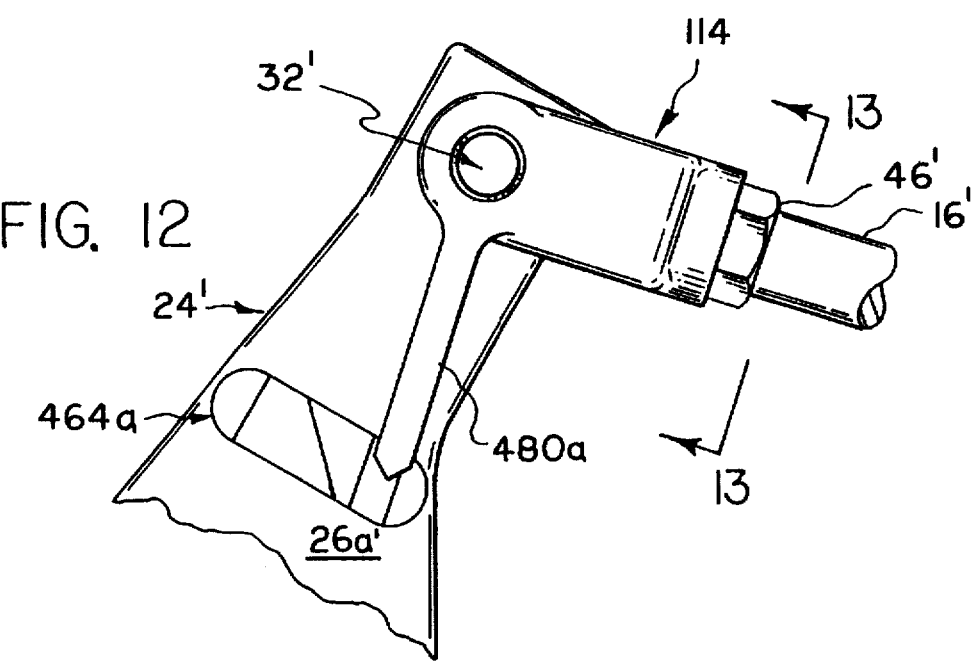
FIG. 12 is a view similar to FIG. 9, but showing a still further pointer construction.

In FIGS. 12 and 13, there is shown a still further form of the invention in association with housing 24', wherein indicia means 464a and 464b are carried on housing sides 26a' and 26b' and have an overall appearance and placement corresponding to that of indicia means of FIGS. 5 and 6. This construction differs from that of FIGS. 5 and 6 in that connector 14' is replaced by a new connector 114, which differs from the former in that it is shaped to define a pair of integral pointer members 480a and 480b arranged to cooperate with indicia means 464a and 464b, respectively.

In FIGS. 14 and 15, an additional form of the invention is shown in association with housing 24', which may include indicia means 564a and 564b carried on housing sides 26a' and 26b', and having an overall appearance and placement corresponding to indicia means of FIGS. 5 and 6. In this construction, pointer means 566 is a U-shaped bracket including a base portion 568 formed with a reference opening 570 for removably receiving operating rod 16', and a pair of parallel arm portions 590a and 590b, which have a pair of aligned bore openings, not shown, sized to slidably receive first pivot pin 32'. Arm portions 590a and 590b further define a pair of aligned pointer members 580a and 580b arranged for cooperation with indicia means 564a and 564b, respectively, in order to simultaneously indicate brake release position shown in FIG. 14 and when movement of operating rod 16' exceeds some predetermined or desired limit. The clamping of base portion 568 against connector 14' by nut 46' insures movement of pointer means 566 with the connector about the axis of pivot pin 32'.

In the illustrated forms of the invention, indicia means are shown as being carried on both of the opposite sides of a housing of a slack adjuster, and each of such means has been described as including separate colored bands for providing a visual indication of both when an operating rod is disposed in a brake release position and when it has been moved therefrom through a distance exceeding a desired limit of brake operating movement. The present invention is not, however, so limited in that it is contemplated that slack adjusters may be provided with a single indicia means, which would be applied by a workman to a brake adjuster at the time of installation thereof on that side thereof desired to be viewed for inspection purposes. It is also contemplated that the indicia means may be employed to indicate only one of the positions of the operator rod, and that a label bearing colored strips or bands may be replaced by markings formed integrally with the housing sides of a slack adjuster.

What is claimed is:

1. In an automatic slack adjuster for vehicle brakes having an elongated housing provided with oppositely facing sides extending between first and second ends of said housing, a first opening extending between said sides adjacent said first end for receiving a pivot pin by which a connector carried adjacent a free end of a brake operating rod is pivotally connected to said one end and with a second opening extending between said sides adjacent said second and for receiving a worm gear mounted for rotation with a shaft adapted to operate said brakes, said housing slidably supporting a link extending lengthwise thereof and having a free end for receiving a second pivot pin for connecting said free end to said connector, and said first and second pivot pins are parallel, said operating rod having a brake release position and being movable therefrom for effecting rotation of said shaft to operate said brakes, the improvement comprising in combination:

means for providing a visual indication of movement of said operating rod relative to said brake release position, and said means includes indicia means carried by said housing, and pointer means supported by said first and second pivot pins for movement therewith and arranged to cooperate with said indicia means to indicate when said operating rod is in said brake release position and when movement of said operating rod away from said brake release position exceeds a desired limit of brake operating movement, said pointer means is a bracket having a first portion formed with a centrally located first bore opening for removably slidably receiving said first pivot pin and a pair of second bore openings uniformly spaced from said first bore opening and adapted to alternatively receive said second pivot pin, and a second portion defining a pointer member extending normal to said first portion from adjacent said first bore opening and terminating in a free end, and said first and second bore openings cooperate with said first and second pivot pins to support said bracket for alternatively positioning said pointer member adjacent each of said sides with said free end portion arranged for cooperation with said indicia means.

2. A combination according to claim 1, wherein said pointer member is stepped intermediate said free end and said first portion.

* * * * *